United States Patent [19]

Kita et al.

[11] Patent Number: 5,058,022

[45] Date of Patent: Oct. 15, 1991

[54] DEVICE FOR DETECTING ENGINE BRAKE

[75] Inventors: Yasuo Kita; Hiroyuki Fujii; Hiroshi Uzawa, all of Kyoto, Japan

[73] Assignee: Shimadzu Corporation, Kyoto, Japan

[21] Appl. No.: 330,704

[22] Filed: Mar. 30, 1989

[30] Foreign Application Priority Data

Apr. 30, 1988 [JP] Japan .................. 63-108041

[51] Int. Cl.$^5$ ............................ F02M 51/00
[52] U.S. Cl. ................. 364/431.07; 364/431.04; 123/493
[58] Field of Search ............... 364/431.03, 431.04, 364/431.05, 431.07, 424.1; 123/320, 440, 480, 492, 493; 73/116, 117.3; 74/866

[56] References Cited

U.S. PATENT DOCUMENTS

| | | | |
|---|---|---|---|
| 4,123,999 | 11/1978 | Asano | 123/440 |
| 4,561,327 | 12/1985 | Niwa et al. | 74/866 |
| 4,702,127 | 10/1987 | Cote | 364/424.1 |
| 4,792,901 | 12/1988 | Mack et al. | 364/424.1 |
| 4,841,447 | 6/1989 | Hayashi et al. | 364/431.07 |

Primary Examiner—Salvatore Cangialosi
Attorney, Agent, or Firm—Armstrong, Nikaido, Marmelstein, Kubovcik & Murray

[57] ABSTRACT

A device for detecting whether an engine brake condition exists includes a memory for storing the rotating speed of the engine corresponding to the degree of opening of the throttle valve, a detector for detecting the degree of opening of the throttle valve, a detector of the actual rotating speed of the engine, and a device for determining that the engine is an engine brake state when the actual speed of the engine corresponding to the actual degree of opening of the throttle valve exceeds the speed of the engine stored in the memory.

3 Claims, 4 Drawing Sheets

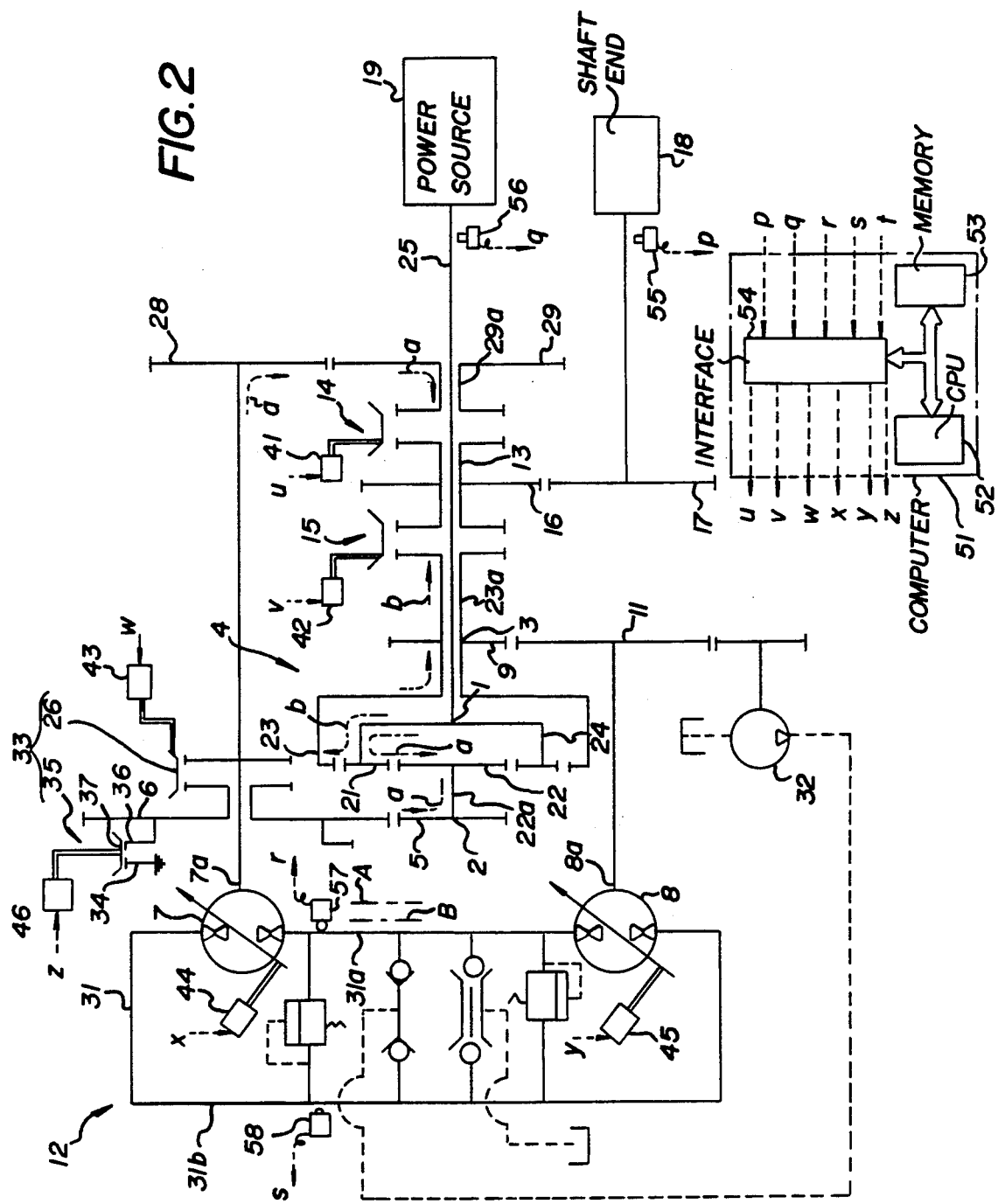

DEVICE FOR DETECTING ENGINE BRAKE

BACKGROUND OF THE INVENTION

The present invention relates to a device for detecting any engine braking, and more particularly to a device for detecting any load acting on the engine.

In order to detect whether an output from an engine is positive or negative (hereinafter the latter will be referred to as "engine braking"), the common practice is to use a torque detector in a output shaft of the engine or any other transmission line, thereby ascertaining the direction of torque.

However, the torque detector disadvantageously requires a complicated auxiliary measuring tool so as to discern in which direction the torque acts. In addition, its size is large and its weight is heavy. The large-size and heavy torque detector is not suitable for automobile engines which have a limited space. As a result, it is difficult to detect a load unexpectedly acting on the engine, which makes it impossible to adjust the speed reduction ratio appropriately and regulate the engine output to optimum values suitably for the case.

SUMMARY OF THE INVENTION

The present invention is directed toward a device for detecting any unexpected load acting on the engine which solves the problems pointed out with respect to the conventional torque detectors. Thus an object of the present invention is to provide a device for detecting any load acting on an engine.

Another object of the present invention is to provide a device for detecting any load acting on the engine, the device requiring no large accommodation space and being light-weight.

The object of the present invention is achieved by providing a detector which comprises a memory for storing the rotating speeds of the engine corresponding to the degree of opening the throttle valve; means for detecting the degree of opening the throttle valve; means for detecting the actual rotating speed of the engine, and means for discerning that the engine is in an engine brake state when the actual degree of opening the throttle valve exceeds the speed of the engine stored in the memory.

Other objects and advantages of the present invention will become more apparent from the following detailed description, when taken in conjunction with the accompanying drawings which show, for the purpose of illustration only, one embodiment in accordance with the present invention.

BRIEF DESCRIPTION OF THE DRAWINGS

FIG. 2 is a flowchart explaining the hydraulic circuits incorporated in the device shown in FIG. 1;

DETAILED DESCRIPTION OF THE PREFERRED EMBODIMENT

Figure 1:
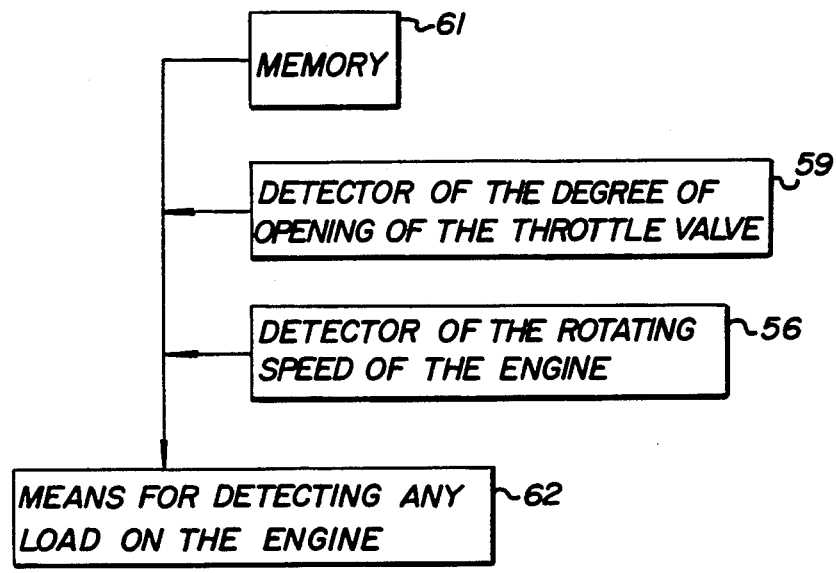
FIG. 1 is a block diagram showing the structure of a detector according to the present invention.

Referring to FIGS. 2 to 6, a stepless speed reducer will be described, which incorporates the device of the present invention:

The stepless speed reducer includes a first, a second and a third input/output end 1, 2 and 3, respectively. There is provided a differential gear unit 4 which has a mechanical transmission line (a) for low speeds between the first and second input/output end 1 and 2, and a mechanical transmission line (b) for high speeds (b) between the first and third input/output ends 1 and 3. There is provided a first pump motor 7 which has its shaft end 7a connected to the second input/output end 2 through gears 5, 6, and a second pump motor 8 which has its shaft end 8a connected to the third input/output end 3 through gears 9 and 11. The two motors 7 and 8 supply fluids to hydraulic transmission mains (A) and (B) in a hydraulic transmission unit 12. An end of the low-speed transmission line (a) is engageable with a rotary center boss 13 by means of a clutch 14. An end of the high-speed transmission line (b) is engageable with the center boss 13 by means of a clutch 15. The center boss 13 is connected to an output shaft end 18 through gears 16 and 17.

The differential gear unit 4 comprises planetary gears 21 located along an orbit, a sun gear 22 located in the center of the orbit, and a ring gear 23 located outside the orbit. The differential gear unit 4 has a gear retainer 24 which has the input/output end 1 at its center. An input shaft 25 is disposed at the input/output end 1 connected to a source of power 19. The sun gear 22 has a supporting shaft 22a whose end constitutes the input/output end 2 to which the gear 5 is fixed. The ring gear 23 has a boss 23a whose end constitutes the third input/output end 3 to which the gear 9 is fixed.

In addition to the planetary gears 21, the sun gear 22, the gears 5, 6, the low-speed mechanical transmission line (a) includes a clutch 26 and gears 28, 29, the last-mentioned gear 29 having a boss 29a which functions as a transmission end. The high-speed transmission line (b) includes the planetary gears 21 and the ring gear 23, the ring gear 23 having a boss 23a which functions as a transmission end.

The pump motors 7 and 8 included in the hydraulic transmission unit 12 are each capable of varying capacities and are connected in series to each other through a hydraulic path 31. The motor 7 has an input/output shaft 7a connected to a supporting shaft 22a of the sun gear 22 through the gears 5, 6. The motor 8 has an input/output 8a connected to the ring gear 23 through the gears 9, 11. The reference numeral 32 denotes a booster pump disposed in the fluid path 31.

There is provided a changeover member 33 between the second input/output end 2 and the pump motor 7, so as to change the direction of output. The changeover member 33 connects the gear 6 to the shaft end 7a of the motor 7 through the clutch 26, and has a one-way clutch 35 between the gear 6 and a fixture 34. The one-way clutch 35 locks a ratchet wheel 36 by means of a pawl 37 fixed to the fixture 34 so as to prevent the second input/output end 2 from rotation only when the car is to run backward.

The clutches 14, 15 and 26 are actuated by actuators 41, 42, and 43, respectively. There are provided other actuators 44 and 45, which are designed to vary a displaceable capacity of the pump motors 7 and 8. Hereinafter this capacity will be referred to as "displacement". The actuators 44 and 45 are controlled by a computer 51.

The computer 51 includes a central processing unit (CPU) 52, memories 53 and an interface 54. The computer 51 includes a memory 61 for storing the rotating speed of the engine, and means 62 for discerning any load acting on the engine. The interface 54 receives various signals; that is, a signal (p) from a first sensor 55 for detecting an output rotating speed, a signal (q) from a second sensor 56 for detecting an input rotating speed, a signal (r) from a first pressure sensor 57 disposed in that circuit part 31a of a hydraulic pressure main 31 which becomes high in the low speed mode, a signal (s) from a second pressure sensor 58 disposed in that circuit part 31b of the main 31 which becomes high in the high speed mode, and a signal (t) indicating the fuel supply to the engine 19 so as to control the output thereof. The interface 54 generates various signals; that is, a signal (u) for operating the actuator 41 for the low-speed clutch 14, a signal (v) for operating the actuator 42 for the high-speed clutch 15, a signal (w) for operating the actuator 43, signals (x) and (y) for operating the actuators 44 and 45, respectively, and a signal (z) for operating the actuators 46. The memory 53 stores programs, such as the program shown in FIG. 6.

Figure 5:
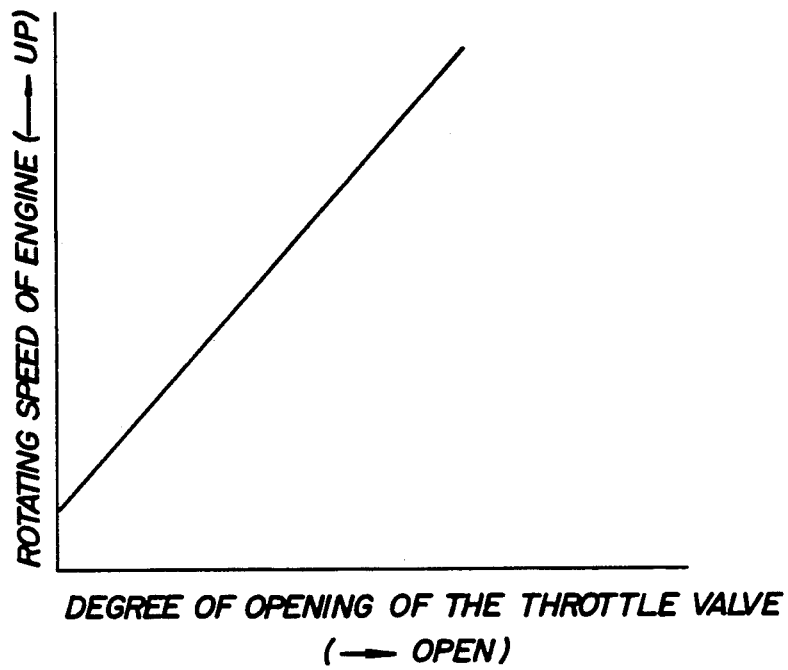
FIG. 5 is a graph showing the relationship between the rotating speed of the engine and the degree of opening a throttle valve.
Figure 3:
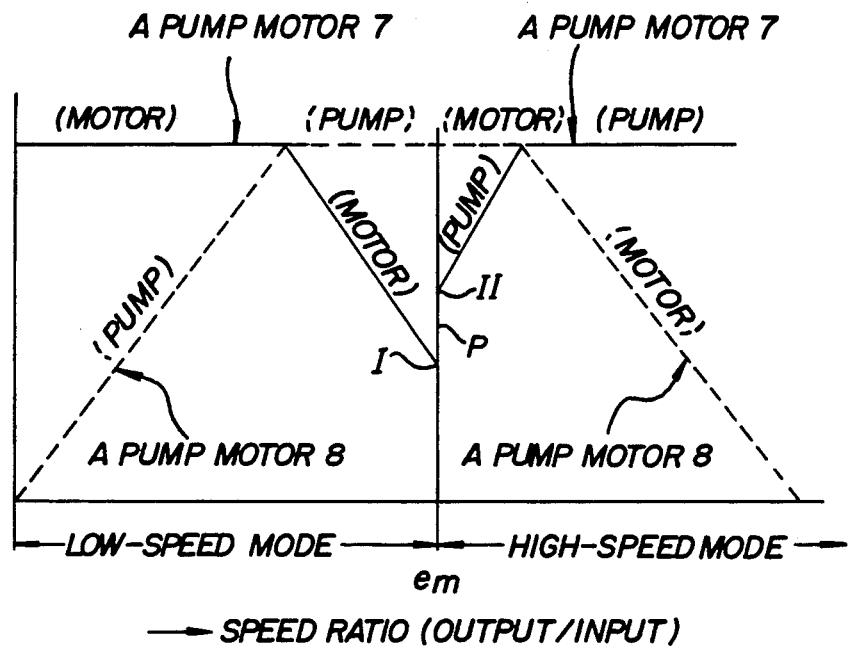
FIGS. 3 and 4 are diagrammatic graphs explaining modes in which hydraulic pump motors are controlled.
Figure 4:
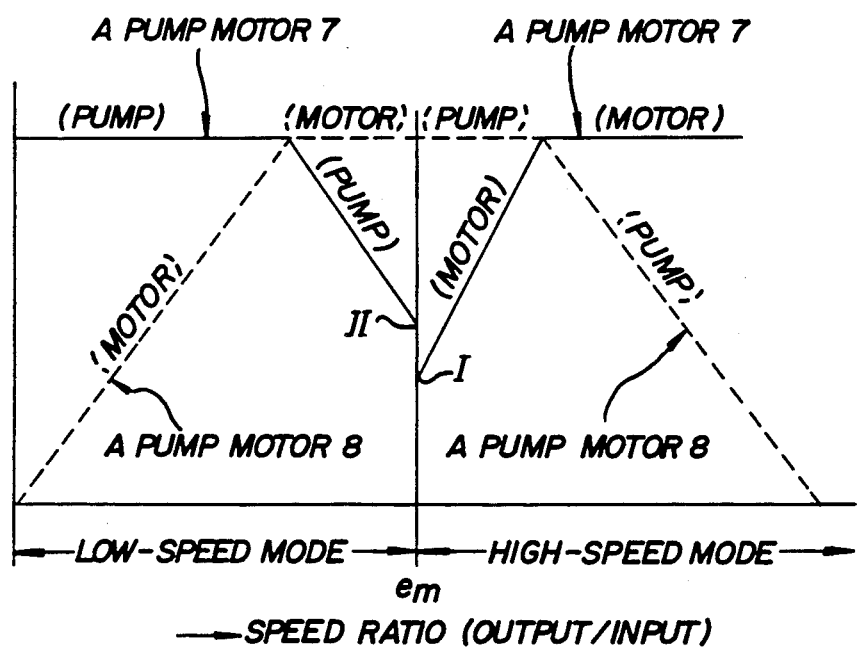
Figure 6:
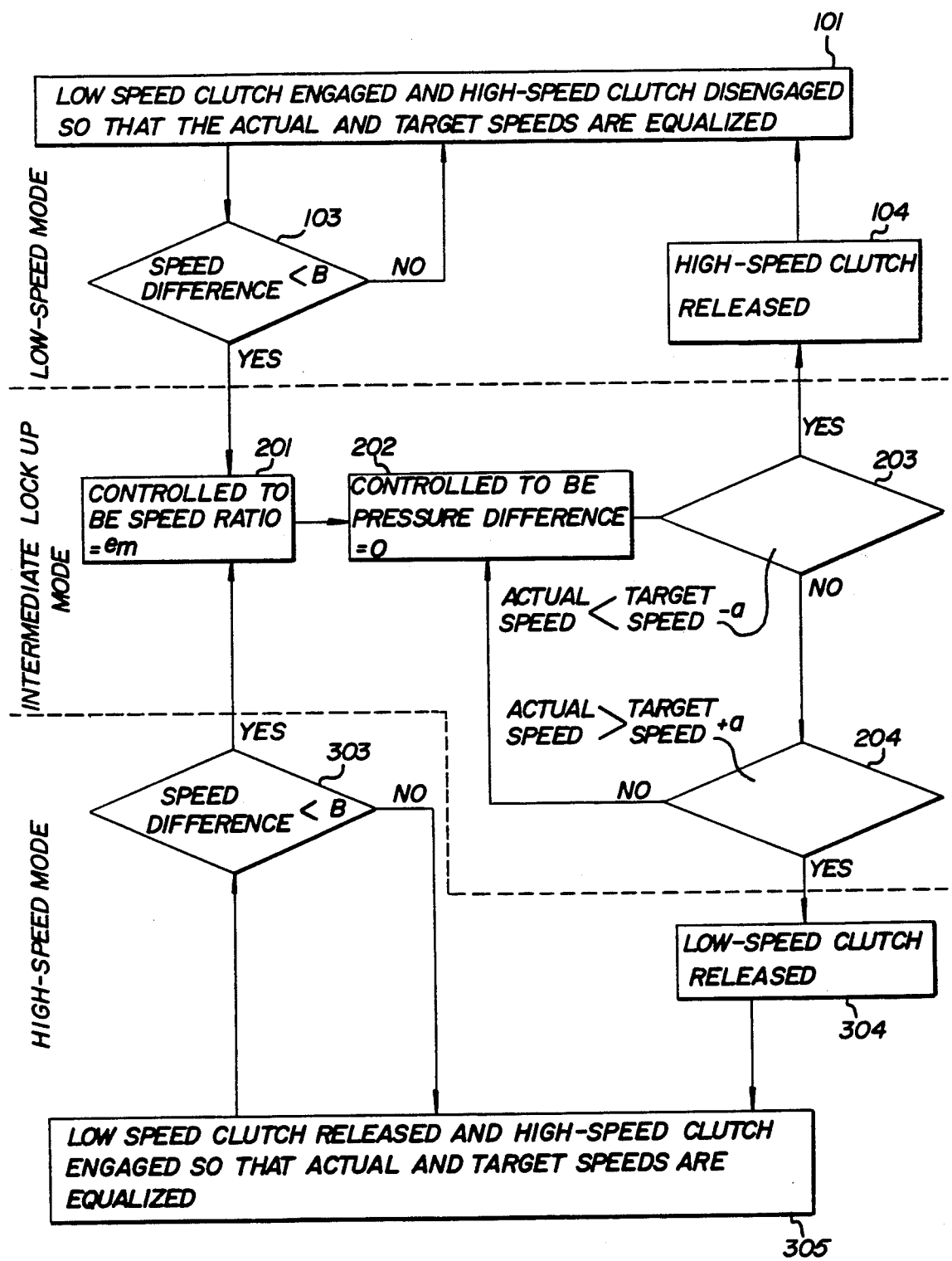
FIG. 6 is a flowchart showing a state of controlling the system.

Taking an example from a car which runs forward with the clutch 26 being in engagement, how the stepless speed reducer operates will be described by reference to FIG. 6:

In a driving area in which the speed ratio (e) (output rotating speed/input rotating speed) is below a predetermined intermediate speed ration ($e_m$), the low speed mode is selected by engaging the clutch 14 for low speed and disengaging the clutch 15 for high speed (step #101). More specifically, the speed ratio (e) is consecutively calculated on the basis of an output rotating speed detected by the first sensor 55 and an input rotating speed detected by the second sensor 56. The predetermined intermediate speed ratio ($e_m$) corresponds to where the transmission ends of the line (a) and the line (b) rotate at an equal speed. In this low speed mode the input side and the output side are mutually communicated through the transmission line (a) passing between the input/output ends 1 and 2, thereby transmitting power from the engine 19 to the output shaft 18 through the line (a). In this situation, the pump motor 7 functions as a motor whereas the pump motor 8 functions as a pump. The torque of the third input/output end 3 is transmitted to the output shaft 18 through a hydraulic transmission main (A) passing between the pump motors 7 and 8. In the low speed mode the displacement of the pump motor 8 is increased as shown in FIGS. 3 and 4, and after the displacement reaches the maximum capacity, the other pump motor 8 progressively reduces its capacity. In this way the rotating speed of the output shaft 18 increases in accordance with the rotation of the input shaft 25. By controlling the displacements of the pump motors 7 and 8 an instruction signal is generated to the actuators 44 and 45 such that a target rotating speed corresponding to the degree of opening of the throttle valve may be equal to an actual rotating speed of the engine 19 detected by the sensor 56. As shown in FIG. 5, the target rotating speed of the engine 19 under no load is proportional to the degree of opening of the throttle valve which also has been previously stored in the memory 53, in addition to the above-mentioned program shown in FIG. 6. The target rotating speed for each operation of the engine 19 is appropriately selected by signals (t) input in accordance with the varying degrees of opening of the throttle valve.

In the low speed mode, if the difference in speed between the low-speed clutch 14 and the high-speed clutch 15 becomes smaller than the constant ($\beta$) (step #103), the intermediate lock-up mode is reached. In this case, the displacement of the pump motor 7 is controlled with each other, and then they are engaged (step #201) and locked such that the speed ratio may become the predetermined intermediate speed ratio ($e_m$). Immediately after the displacement of the pump motor 7 is controlled, and the pressure difference between the hydraulic transmission mains (A) and (B), that is, the lines 31a and 31b becomes zero (step #202). The control of the displacement operates the actuator 44 so as to equalize the detected values of the sensors 57 and 58 (refer to the point P in FIG. 3). When the intermediate lock-up mode is reached in the above-mentioned manner, different controls are required depending upon when the car is in a normal running state or when it is in an engine brake state. FIG. 3 shows this situation where the pump motor 7 functions as a motor whereas the pump motor 8 functions as a pump. As a result, when the intermediate mode is about to occur, the capacity of the pump motor 7 is shifted to the point (I), and then the capacity is changed in the increasing direction, thereby achieving the intermediate lock-up mode. When the engine 19 is in the engine brake state due to the reverse rotation of the wheels, the pump motor 7 functions as a pump, whereas the pump motor 8 functions as a motor. As a result, when the intermediate mode is about to occur, the capacity of the pump motor 7 is shifted to the point (II), and then the capacity is changed in the decreasing direction, thereby achieving the intermediate lock-up mode. If the conditions for shifting to the high-speed mode are satisfied, the capacity of the pump motor 7 is incremented so as to make up for leakage. When the point (II) is reached, where the torque of the low-speed clutch 14 becomes zero, the clutch 14 is released so as to shift the mode to the high speed mode. In this situation, if the car is in the engine brake state, a further control is required or in other words, it is necessary to change the capacity of the engine toward the point I. It will be appreciated from this fact that if, depending upon whether the engine brake state exists or not, it is previously known whether the capacity should be controlled toward the point (I) or the point (II) upon satisfaction of the prescribed conditions, and the speed can be quickly adjusted. This is a great advantage of the present invention.

As shown in FIG. 5, the relationship between the degree of opening the throttle valve under non-load and the rotating speed of the engine is stored in the memory 54 of the computer 51. The degree of opening of the throttle at each point of time and the actual rotating speeds of the engine 19 are detected by a signal (t) from the throttle sensor 59 and a signal (q) from the rotating speed sensor 56. If the actual speed exceeds the speed of the engine under non-load with respect to the same degree of opening of the throttle, it is judged that the car is in an engine brake state. Whereas, if the actual speed is smaller than the speed of the engine under non-load, it is judged that the car is in a normal running state. If the engine 19 is equipped with any other load such as an air conditioner, it is desirable to store several kinds of maps shown in FIG. 5 in the memory and refer to them as the case may be.

In the intermediate lock-up mode, if the actual speed exceeds the target speed beyond a prescribed range ($\alpha$) (step #204), the mode is shifted to the high-speed mode by disengaging the low-speed clutch 14 (step #304). The situation where the actual speed exceeds the target speed beyond the range ($\alpha$) includes a special case where the speed increases because of a reduction in the load acting on the engine irrespective of the constant operation of the accelerator by the driver. In this special case, it is advisable to boost the load acting on the engine, so that the lock-up mode should be released during the intermediate lock-up mode so as to shift to the high-speed mode. In this situation, the displacement of the pump motor 7 is increased, and after the torque transmitted from the low-speed mechanical transmission line (a) to the center boss 13 becomes zero, the low-speed clutch 14 is released.

When the driver deliberately steps down the accelerator to reduce the target speed far below the actual speed; in other words, when the engine brake is increased because of an external load input to the engine 19 so that the actual speed thereof is larger than the target speed, it is possible to release the lock-up mode in the intermediate lock-up mode so as to shift to the high-speed mode. In this situation, the engine 19 receives an input through the output shaft 18, thereby enabling the pump motors 7 and 8 to function oppositely from when the engine 19 receives an output. In this way when the clutches 14 and 15 are to be changed in the intermediate lock-up mode, the degree of the eccentricity of the pump motor 7 is adjusted in the opposite direction to that described above. More specifically, if it is ascertained that the car is in an engine brake state in the intermediate lock-up mode, the displacement of one of the pump motors 7 is slightly reduced so as to enable no torque to act on the center boss 13 from the mechanical transmission line (a) on the low-speed side. Then the low-speed clutch 14 is released.

If in the intermediate lock-up mode the actual speed of the engine 19 detected by the sensor 56 becomes slower than the target speed beyond a predetermined range ($\alpha$) (step #203), the high-speed clutch 15 is released to return to the low-speed mode (step #104). The situation where the actual speed slows down more than the target speed beyond the range ($\alpha$) includes a case where the speed does not increase up to a desired value irrespective of the constant boosting of the throttle by the driver, and another case where the speed does not increase because of an increasing load on the engine irrespective of the constant operation of the accelerator by the driver. In the latter case, it is advisable to reduce the load acting on the engine, so that the lock-up mode should be released during the intermediate lock-up mode so as to shift to the low-speed mode. In shifting to the low-speed mode the displacement of one of the pump motors 7 is slightly reduced so as to allow no torque to act on the center boss 13 from the high-speed mechanical transmission line (b). Then the high-speed clutch 15 is released.

When the high-speed mode is reached, the mechanical transmission line (b) is formed between the input-/output ends 1 and 2 of the differential gear unit 4, and the input power is directly transmitted to the output shaft 18 through the line (b). In this situation, the pump motor 7 functions as a pump, whereas the pump motor 8 functions as a motor, whereby the second input/output end 2 of the differential gear unit 4 imparts its torque to the output shaft 18 through the hydraulic transmission system (B) formed between the pump motors 7 and 8. In this high-speed mode the displacement of one of the pump motors 7 is gradually increased, and after the displacement thereof reaches its peak, the displacement of the other pump motor 8 is gradually decreased. Thus the speed of the output shaft 18 increases in accordance with an increase in that of the output shaft 25.

The displacement of the pump motors 7 and 8 is controlled by sending signals to the actuators 44 and 45 so as to equalize the actual speed of the engine 19 detected by the sensor 56 and the target speed corresponding to the degree of opening the throttle valve (step #301).

In the high-speed mode if the difference in speed between the low-speed clutch 14 and the high speed clutch 15 becomes smaller than the predetermined value ($\beta$) (step #303) the intermediate lock-up mode is reached in the above-mentioned manner.

In such situations, whether or not the car is in the engine brake state is easily detected by comparing the individual target speeds previously set so as to correspond to the anticipated degree of opening of the throttle valve and each actual speed consecutively input in accordance with the actual degree of opening thereof. In the present invention, arithmetic operations are easily processed in the computer 51, and furthermore, no large space is required nor is a heavy additional weight involved. The device of the present invention is applicable to various appliances which have an intermediate lock-up mode to enhance the efficiency of the system; more specifically, in the intermediate lock-up mode it is possible to appropriately determine the direction of controlling the pump motors 7 and 8 depending upon whether or not the engine brake occurs. If the displacement of the pump motor 7 is controlled to give no pressure difference between the circuits 31$a$ and 31$b$, the power-transmission ratio between the hydraulic transmission mains (A) and (B) is made zero, and then the power is transmitted through the mechanical transmission lines (a) and (b). The present invention has made it possible to have an area in the driving mode in which the hydraulic power transmission mains (A) and (B) have no power-transmission ratio, and also it is possible to appropriately select the pump motors 7 or 8 depending upon whether or not the engine brake occurs. Thus the driving efficiency is maintained. In this way if the driving system is controlled so that no pressure difference between the circuits is attained, the pump motors 7 and 8 are less liable to leakage loss or torque loss. As a result, the hydraulic mains (A) and (B) are saved from a possible energy loss, thereby maintaining the transmission efficiency of the stepless speed reducer. Even if the actual speed of the engine becomes different from the target speed, the efficiency of the system as a whole is maintained and the mileage will be enhanced. In addition, the more occasions there are of having no pressure difference between the hydraulic mains (A) and (B), the more the pump motors 7, 8 and ancillary devices are protected against wear.

In the illustrated embodiment the detector of the present invention is applied to change the direction of controlling the pump motors 7, 8 in order to switch one clutch to another through the detection of the car being in the engine brake state, but the application is not limited thereto. The feature of the invention resides in the ready detection of an engine brake, and the detecting signals can be used for many applications.

What is claimed is:

1. A device for detecting an engine brake state, comprising:
   a memory for storing a plurality of rotating speeds of the engine under a no-load condition as a function of a degree of opening of the throttle valve;
   throttle valve opening detecting means for detecting an actual degree of opening of the throttle valve;
   rotation speed detecting means for detecting an actual rotating speed of the engine; and
   determining means for determining whether the engine is in an engine brake state by comparison of a detected actual speed of the engine with an engine speed stored in said memory corresponding to the detected actual degree of opening of the throttle valve, an engine braking state existing when said detected actual speed of the engine exceeds the speed of the engine retrieved from said memory, and for outputting an engine brake signal as a result of the comparison.

2. A device for detecting existence of an engine brake condition in a system, the system including a throttle valve and an engine having a rotating speed, comprising:
   a memory for storing a plurality of values of the rotating speed of the engine under a no-load condition as a function of a degree of opening of the throttle valve;
   throttle valve opening detecting means for detecting an actual degree of opening of the throttle valve;
   rotational speed detecting means for detecting an actual rotating speed of the engine; and
   determining means for retrieving a engine speed from said memory corresponding to the detected actual degree of opening of the throttle valve and for determining whether the engine is in an engine brake state by comparison of a detected actual speed of the engine with an engine speed stored in said memory corresponding to the detected actual degree of opening of the throttle valve, and when an engine brake state exists said determining means outputs an engine brake signal indicating existence of said engine brake state.

3. A device for detecting existence of an engine brake state, comprising:
   a memory for storing a plurality of no-load engine speeds each representing the rotating speed of the engine under a no-load condition together with an associated degree of opening of the throttle valve for each of said plurality of no-load engine speeds;
   throttle valve opening detecting means for detecting an actual degree of opening of the throttle valve;
   rotation speed detecting means for detecting an actual rotating speed of the engine; and
   determining means for determining whether the engine is in an engine brake state by comparison of an actual speed of the engine with a no-load engine speed stored in said memory which corresponds to the detected actual degree of opening of the throttle valve, wherein engine braking is determined to exist when said actual detected speed of the engine exceeds the no-load speed of the engine stored in said memory, an engine braking state existing when said detected actual speed of the engine exceeds the speed of the engine retrieved from said memory, and for outputting an engine brake signal as a result of the comparison.

* * * * *